US008894051B2

(12) United States Patent
Yamamoto et al.

(10) Patent No.: US 8,894,051 B2
(45) Date of Patent: Nov. 25, 2014

(54) LIQUID-SEALED VIBRATION ISOLATOR

(75) Inventors: Kentaro Yamamoto, Osaka (JP);
Yoshiyuki Seno, Osaka (JP); Gen Isawa, Osaka (JP); Katsuhiro Sakurai, Aichi (JP)

(73) Assignees: Toyo Tire & Rubber Co., Ltd., Osaka-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/522,413

(22) PCT Filed: Nov. 26, 2010

(86) PCT No.: PCT/JP2010/006920
§ 371 (c)(1),
(2), (4) Date: Jul. 16, 2012

(87) PCT Pub. No.: WO2011/089669
PCT Pub. Date: Jul. 28, 2011

(65) Prior Publication Data
US 2012/0292838 A1    Nov. 22, 2012

(30) Foreign Application Priority Data
Jan. 21, 2010  (JP) .................................. 2010-011216

(51) Int. Cl.
*F16F 5/00*    (2006.01)
*F16F 13/10*    (2006.01)

(52) U.S. Cl.
CPC ..................................... *F16F 13/106* (2013.01)
USPC ..................................... 267/140.13; 267/219

(58) Field of Classification Search
USPC ........................ 267/140.11–140.7, 141, 219
See application file for complete search history.

(56) References Cited

U.S. PATENT DOCUMENTS

2007/0085249 A1    4/2007    Happou et al.
2011/0210488 A1*   9/2011    Yamamoto et al. ...... 267/140.13
(Continued)

FOREIGN PATENT DOCUMENTS

JP            63-9537 U      1/1988
JP       2003-139189 A       5/2003
(Continued)

OTHER PUBLICATIONS

International Search Report for PCT/JP2010/006920, mailing date of Feb. 22, 2011.

(Continued)

*Primary Examiner* — Vishal Sahni
(74) *Attorney, Agent, or Firm* — Westerman, Hattori, Daniels & Adrian, LLP

(57) ABSTRACT

Disclosed is a liquid-sealed vibration isolator (10) provided with a main liquid chamber (42), a portion of the chamber wall of which is formed from a vibration isolating base (16), a subsidiary liquid chamber (44), a portion of the chamber wall of which is formed from a first diaphragm (38), and a first orifice flow path (50) which connects both liquid chambers, wherein a high-frequency second orifice flow path (54) which connects the main liquid chamber (42) and the subsidiary liquid chamber (44) is formed on a partitioning body (40), and a second diaphragm (60) is provided on the opening (59A) of the second orifice flow path (54) on the side of the main liquid chamber. The outer peripheral portion (60A) of the second diaphragm is held by the partitioning body (40) in a liquid-tight manner, and the second diaphragm (60) abuts the peripheral edge portion of the opening (54A) so as to block said opening with a flexible membrane section (60B) which is provided on the inside of the second diaphragm (60). Moreover, a through hole (74) is disposed on the flexible membrane section (60B) at a position which does not overlap the opening (54A).

8 Claims, 5 Drawing Sheets

(56) References Cited

U.S. PATENT DOCUMENTS

2012/0228813 A1* 9/2012 Masuda et al. ............ 267/140.13
2012/0248669 A1* 10/2012 Masuda et al. ............ 267/140.13

FOREIGN PATENT DOCUMENTS

| | | |
|---|---|---|
| JP | 2007-107712 A | 4/2007 |
| JP | 2007-270866 A | 10/2007 |
| JP | 2007-271004 A | 10/2007 |
| JP | 2008-175321 A | 7/2008 |

OTHER PUBLICATIONS

Japanese Office Action dated Jun. 26, 2012, issued in corresponding Japanese Patent Application No. 2010-011216, (4 pages). With English Translation.

Chinese Office Action dated Dec. 12, 2013, issued in corresponding Chinese Application No. 201080061695.4 with English Translation. (17 pages).

Chinese Office Action dated May 20, 2014, issued in corresponding Chinese Patent Application No. 201080061695.4 with abridged English translation (14 pages).

* cited by examiner

LIQUID-SEALED VIBRATION ISOLATOR

TECHNICAL FIELD

The present invention relates to a liquid-sealed vibration isolator.

BACKGROUND ART

As a vibration isolator such as an engine mount that bears the vibration of a vibration source, such as an automobile engine, so as to not be transmitted to a vehicle body side, a liquid-sealed vibration isolator is known which includes a first fixture attached to the vehicle body side, a second fixture attached to the vibration source side, a vibration isolating base interposed between the fixtures and constituted by a rubber-like elastic body, a main liquid chamber in which a portion of a chamber wall is formed by the vibration isolating base, a subsidiary liquid chamber in which a portion of a chamber wall is formed by a diaphragm, and an orifice flow path through which the liquid chambers communicate with each other.

In such a liquid-sealed vibration isolator, when a normal vibration is input, a vibration damping function and a vibration isolation function are, fulfilled by a liquid column resonance action due to a fluid flow in the orifice flow path and a vibration control effect of the vibration isolating base. However, when a large vibration is input, the vibration isolator itself becomes a generation source of abnormal noise which is transmitted into the vehicle interior in some cases.

The abnormal noise is generated by cavitation in the liquid chamber. Cavitation is a phenomenon caused by the fact that, when a large vibration is input into the vibration isolator, the orifice flow path is clogged, whereby the inner portion of the main liquid chamber enters an excessive negative pressure state and falls below the saturated vapor pressure of the sealed liquid, and a large number of bubbles are generated. Moreover, the impact sound, which is generated when the bubbles generated in this manner are extinguished, becomes an abnormal noise and is transmitted to the outside.

Thus, in order to prevent the generation of abnormal noise due to cavitation, for example, PTL 1 mentioned below discloses that a short-circuit path performing short-circuiting of the main liquid chamber and the subsidiary liquid chamber is provided in a partitioning member partitioning both liquid chambers, a valve main body switching the short-circuit path into a communication state and a closed state is formed by a metal spring such as a plate spring, whereby, when the main liquid chamber enters the excessive negative state, the short-circuit path is opened to supply liquid from the subsidiary liquid chamber to the main liquid chamber. Furthermore, as mentioned below, PTL 2 also discloses a configuration in which the same valve main bodies are held by the spring.

Furthermore, as mentioned below, PTL 3 discloses a configuration which has a function as a check valve by providing a movable membrane in a partitioning body partitioning the main liquid chamber and the subsidiary liquid chamber, providing a slit-like opening portion functioning as a valve main body in a part of the movable membrane, and offsetting the arrangement of the valve main body portion to the subsidiary liquid chamber side with respect to a valve main body displacement restriction member.

PRIOR ART DOCUMENT

Patent Literature

[PTL 1] JP-A-2007-107712
[PTL 2] JP-A-2007-270866
[PTL 3] JP-A-2008-175321

SUMMARY OF INVENTION

Problem that the Invention is to Solve

In the configuration of PTL 1 mentioned above, because of a structure in which the metal spring and the partitioning member come into contact with each other via the valve main body, when reinstating the valve main body position after opening the valve, the impact is great due to the collision between the rigid bodies, and thus there is a concern that an abnormal noise is generated. Furthermore, since the metal spring is in antifreeze, there is a need for rust proofing, which is accompanied by an increase in cost. PTL 2 mentioned above also has a structure in which the valve main body mainly formed by the metal directly connected to the spring comes into contact with the partitioning member, and thus faces the same problem.

Meanwhile, in PTL 3 mentioned above, there is a concern of liquid leaking at all times from a slit provided in the valve main body portion of the movable membrane, and a problem is faced that the damping performance due to the orifice flow path of the outer circumference needed to be originally exhibited in a normal use region is reduced.

The invention has been made in view of the above points, and an object thereof is to provide a liquid-sealed vibration isolator which secures the damping performance in the normal use region and is able to alleviate cavitation due to the rapid pressure fluctuation when a large amplitude is input.

Means for Solving the Problem

The liquid-sealed vibration isolator according to an embodiment of the invention includes a first fixture to be attached to one of a vibration source side and a support side; a second fixture to be attached to the other of the vibration source side and the support side; a vibration isolating base which is interposed between the first fixture and the second fixture and is formed of a rubber-like elastic body; a main liquid chamber, a portion of the chamber wall of which is formed by the vibration isolating base, and which is sealed with liquid; at least one subsidiary liquid chamber, a portion of the chamber wall of which is formed by a diaphragm formed of a rubber-like elastic membrane, and which is sealed with liquid; a first orifice flow path which connects the main liquid chamber with one of the subsidiary liquid chambers; a second orifice flow path which is tuned to a frequency range higher than the first orifice flow path and connects the main liquid chamber with one of the subsidiary liquid chambers; and a partitioning body which partitions the main liquid chamber and one of the subsidiary liquid chambers and is formed with the second orifice flow path. The partitioning body is provided with a second diaphragm formed of a rubber-like elastic membrane in an opening to the main liquid chamber side of the second orifice flow path. The second diaphragm is configured so that an outer peripheral portion is held against the partitioning body in a liquid-tight manner, the second diaphragm is provided by coming into contact with an opening periphery portion so as to block the opening in a flexible membrane section on an inner side than the outer peripheral portion, and the flexible membrane section is provided with a through hole at a position which does not overlap the opening.

Advantageous Effects of Invention

According to the embodiment, it is possible to alleviate cavitation caused by the rapid pressure fluctuation when a large amplitude is input, while demonstrating the damping performance to the vibration of the low-frequency range due to the first orifice flow path and the anti-vibration effect to the vibration of the high-frequency range due to the second orifice flow path in the normal using region. Furthermore, the impact accompanied by the return of the second diaphragm can be decreased to reduce the abnormal noise, whereby lower costs can be promoted by eliminating the need for rust proofing or the like.

DESCRIPTION OF EMBODIMENTS

Figure 1:
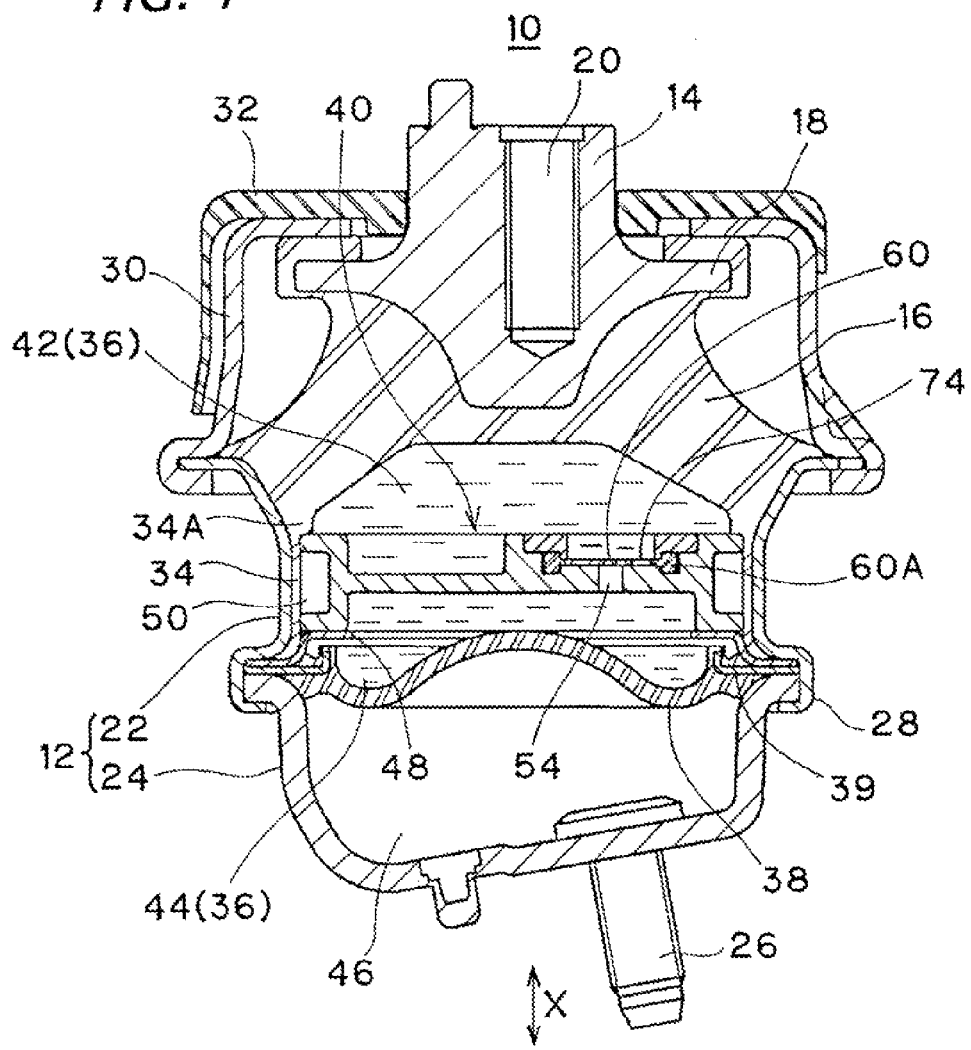
FIG. 1 is a longitudinal cross-sectional view of a liquid-sealed vibration isolator according to a first embodiment.

With the liquid-sealed vibration isolator according to the embodiment, in the normal use region, since the flexible membrane section of the second diaphragm comes into contact with the opening to the main liquid chamber of the second orifice flow path to block the opening, it is possible to prevent leaking of liquid from this portion. Moreover, when the flow rate of the second orifice flow path is equal to or greater than a predetermined amount, the flexible membrane section is subjected to flexural deformation so as to be separated from the opening of the second orifice flow path to the main liquid chamber side, whereby it is possible to supply liquid from the through hole provided in the flexible membrane section to the main liquid chamber side.

For that reason, in the normal use region, in regard to the vibration input of the low-frequency range having a relatively large amplitude, the high damping performance can be exhibited by the flow of liquid via the first orifice flow path of the low-frequency side. Furthermore, in regard to the vibration input of the high-frequency range having a relatively small amplitude, the second diaphragm is minutely deformed while maintaining the closed state to the opening, whereby it is possible to exhibit the anti-vibration effect to the vibration of the high-frequency range by the flow of liquid in the second orifice flow path of the high frequency side.

Meanwhile, when the flow rate of the second orifice flow path reaches a predetermined amount or more by the large amplitude input to the vibration isolator, the flexible membrane section of the second diaphragm is subjected to flexural deformation so as to be separated from the opening of the second orifice flow path to the main liquid chamber side. As a result, since liquid is supplied from the through hole provided in the flexible membrane section to the main liquid chamber side, the pressure relaxation relative to the excessive negative pressure generation in the main liquid chamber can be performed, and the generation of cavitation can be suppressed. Furthermore, after the second diaphragm is separated, when the flow rate of the second orifice flow path reaches a predetermined amount or less, the second diaphragm comes into contact with the opening of the second orifice flow path again. However, because the restoring force is due to the rubber elasticity, the impact associated with the return is small, and the abnormal noise is hardly generated.

In this manner, the second diaphragm having a role as the diaphragm generating the liquid flow in the second orifice flow path in the normal use region is used as a valve for performing the pressure relaxation when the flow rate of the second orifice flow path reaches a predetermined amount. For that reason, because of a structure in which a movable part as the valve is formed from the rubber-like elastic body, there is no need for rust proofing unlike in the case of using a metal spring.

As another embodiment, an opposed wall opposed to a membrane surface of the main liquid chamber side of the flexible membrane section at an interval may be provided at the main liquid chamber side of the second diaphragm, and the flexible membrane section may be provided with a protrusion which is configured to be compressed between the flexible membrane surface and the opposed wall on the membrane surface of the main liquid chamber side at a position which does not overlap the opening of the partitioning body. In this manner, by compressing the protrusion provided in the main liquid chamber side of the flexible membrane section with respect to the opposed wall, the rigidity of the second diaphragm can be changed, and the timing of the separation from the opening of the second orifice flow path can be easily adjusted. For this reason, for example, the rigidity of the membrane section blocking the opening of the second orifice flow path is reduced, and the characteristics of the second orifice flow path of the high-frequency side are improved, and the timing of the separation from the opening of the second orifice flow path can be delayed by the compression of the protrusion, while suppressing the impact when the second diaphragm is returned.

As another embodiment, an annular protrusion may be provided so as to surround the opening in the periphery portion of the opening of the partitioning body or on the membrane surface of the subsidiary liquid chamber side of the flexible membrane section facing the periphery portion. By providing such an annular protrusion, liquid tightness between the second diaphragm and the opening of the second orifice flow path can be made more reliable with respect to the liquid flow in the second orifice flow path until the flow rate of the second orifice flow path reaches a predetermined amount.

As another embodiment, the flexible membrane section may be configured so that a central portion thereof in the radial direction is a stopper portion blocking the opening, and the outside of the stopper portion in the radial direction has one through hole or more. As a result, it is possible to smoothly supply liquid to the main liquid chamber side when the second diaphragm is subjected to flexural deformation.

In this case, the flexible membrane section may be configured so that the through holes are arranged in a plurality of locations on the circumference surrounding the stopper portion, and the protrusions may be provided alternately with the through holes in the plurality of locations on the circumference. In this manner, by alternately arranging the plurality of protrusions and the through holes on the circumference, the rigidity of the second diaphragm relative to the flexural deformation can be equalized on the circumference, whereby the adjustment of the timing of the separation from the opening of the second orifice flow path becomes easier.

As another embodiment, the subsidiary liquid chamber connected to the main liquid chamber by the second orifice flow path may be a subsidiary liquid chamber in which the diaphragm forming a partition with an air chamber or the external air forms a part of the chamber wall. In the subsidiary liquid chamber in which the diaphragm facing the air chamber or the outdoor air is a part of the chamber wall, since the pressure difference between the main liquid chamber and the subsidiary liquid chamber is great, by incorporating a valve configuration of the second diaphragm to the second orifice flow path connecting the subsidiary liquid chamber with the main liquid chamber, the pressure relaxation effect can be increased.

As another embodiment, the first fixture may form a cylindrical shape, the second fixture may be placed on an axial center portion of the first fixture, a first diaphragm may be provided which is attached to the first fixture and is formed of the rubber-like elastic membrane forming a liquid sealing chamber between the first diaphragm and the vibration isolating base on the inside of the first fixture, the partitioning body may partition the liquid sealing chamber into the main liquid chamber of the vibration isolating base side and the subsidiary liquid chamber of the first diaphragm side, the first orifice flow path may be provided on the outer peripheral portion of the partitioning body and connect the main liquid chamber with the subsidiary liquid chamber, and the second orifice flow path may be provided so as to connect the main liquid chamber with the subsidiary liquid chamber in a partitioning body portion on the inner side than the outer peripheral portion. Even in this case, since there is a configuration in which the first diaphragm forming a part of the chamber wall of the subsidiary liquid chamber faces the air chamber and the external air, it is advantageous to enhance the pressure relation effect.

Hereinafter, embodiments of the invention will be described based on the drawings.

[First Embodiment] liquid-sealed vibration isolator 10 according to the present embodiment. The vibration isolator 10 is an engine mount which bears the engine of a vehicle, and includes a lower first fixture 12 which is attached to a vehicle body of a support side and forms a cylindrical shape, an upper second fixture 14 which is attached to the engine side as a vibration source, and a vibration isolating base 16 which is interposed between the both fixtures 12 and 14 and is made of a rubber elastic body connecting both of them.

The second fixture 19 is a boss metal fitting placed above the axial center portion of the first fixture 12, and is formed with a stopper portion 18 which protrudes outward in the radial direction in a flange shape. Furthermore, a bolt hole 20 is provided in the upper end portion thereof and is configured so as to be attached to the engine side via a bolt (not shown).

The first fixture 12 includes a cylindrical barrel-like metal fitting 22 in which the vibration isolating base 16 is vulcanized and molded, and a cup-like bottom metal fitting 24. A downward attachment bolt 26 is projected from the center portion of the bottom metal fitting 24, and the first fixture 12 is configured so as to be attached to the vehicle body side via the bolt 26. The barrel-like metal fitting 22 is configured so that the lower end portion thereof is caulked and fixed to the upper end opening portion of the bottom metal fitting 24 by a caulking portion 28. Reference numeral 30 is a stopper metal fitting which is caulked and fixed to the upper end portion of the barrel-like metal fitting 22, and exhibits the stopper action between the stopper metal fitting and the stopper portion 18 of the second fixture 14. Furthermore, reference numeral 32 is a stopper rubber that covers the upper surface of the stopper metal fitting 30.

The vibration isolating base 16 is formed in a circular truncated cone shape, the upper end portion thereof is vulcanized and bonded to the second fixture 14, and the lower end portion thereof is vulcanized and bonded to the upper end opening portion of the barrel-like metal fitting 22, respectively. A rubber-film-like seal wall portion 34 covering the inner peripheral surface of the barrel-like metal fitting 22 is continuously formed with the lower end portion of the vibration isolating base 16.

A first diaphragm 38 formed of a flexible rubber membrane, which is arranged opposite to the lower surface of the vibration isolating base 16 in the axial direction X and forms a liquid sealing chamber 36 between the lower surface and the first diaphragm 38, is attached to the first fixture 12. A liquid such as water, ethylene glycol, and silicone oil is sealed within the liquid sealing chamber 36. The first diaphragm 38 includes an annular reinforcing metal fitting 39 on the outer peripheral portion thereof and is fixed to the caulking portion 28 via the reinforcing metal fitting 39.

The liquid sealing chamber 36 provided inside the first fixture 12 is partitioned into a main liquid chamber 42 of the vibration isolating base 16 side (that is, the upside) and a subsidiary liquid chamber 44 of the first diaphragm 38 side (that is, the downside), by a partitioning body 40. The main liquid chamber 42 is a liquid chamber in which the vibration isolating base 16 forms a part of the chamber wall, and the subsidiary liquid chamber 44 is a liquid chamber in which the first diaphragm 38 forms a part of the chamber wall. On a lower side of the first diaphragm 38, an air chamber 46 is provided inside the bottom metal fitting 24. Thus, the first diaphragm 38 is a diaphragm that forms a partition between the subsidiary liquid chamber 44 and the air chamber 46.

The partitioning body 40 forms a circular shape when viewed from a plan, is fitted into the inside of the barrel-like metal fitting 22 via the seal wall portion 34, and is formed from a rigid material such as resin or metal. A ring plate-shaped partition receiving plate 48 comes into contact with and is placed on the lower surface of the partitioning body 40. By fixing the partition receiving plate 48 by the caulking portion 28 together with the reinforcing metal fitting 39 of the first diaphragm 38, the partitioning body 40 is held in the state of being interposed between the step portion 34A provided in the seal wall portion 34 and the partition receiving plate 48 in the axial direction X.

The main liquid chamber 42 and the subsidiary liquid chamber 44 communicate with each other via a first orifice flow path 50 as a throttle flow path. In the present example, the first orifice flow path 50 is a low-frequency side orifice which is tuned to a low-frequency range (for example, about 5 to 15 Hz) corresponding to a shake vibration so as to attenuate the shake vibration when a vehicle runs. That is, the first orifice flow path 50 is tuned by adjusting a cross-sectional area and a length of the flow path so that the damping effect based on the resonance action of liquid flowing through the first orifice flow path 50 is effectively exhibited when the shake vibration is input.

The first orifice flow path 50 is provided on the outer peripheral side of the partitioning body 40. Specifically, the first orifice flow path 50 is formed which is extended in a circumferential direction C (see FIG. 3(a)) between a first orifice forming groove 52 (see FIG. 2) opened outward provided on the outer peripheral portion 40A of the partitioning body 40 and the seal wall portion 34. As shown in FIG. 3(a), the first orifice passage 50 is an orifice flow path in a normal communication state which includes a main liquid chamber side opening 50A opened to the main liquid chamber 42 in one end of the circumferential direction C, and a subsidiary liquid chamber side opening 50B opened to the subsidiary liquid chamber 44 in the other end of the circumferential direction C, and always communicates with both of the main liquid chamber 42 and the subsidiary liquid chamber 44 without being closed.

The main liquid chamber 42 and the subsidiary liquid chamber 44 communicate with each other via the second orifice flow path 54 as the throttle flow path. The second orifice flow path 54 is a high-frequency side orifice tuned to the frequency range higher than the first orifice flow path 50, and in the present example, is tuned to the high-frequency range (for example, about 15 to 50 Hz) corresponding to the idle vibration so as to reduce the idle vibration during idle (when the vehicle is stopped). That is, the second orifice flow path 54 is tuned by adjusting the cross-sectional area and the length of the flow path so that the low dynamic spring effect based on the resonance action of liquid flowing through the second orifice flow path 54 is effectively exhibited when the idle vibration is input.

Figure 2:
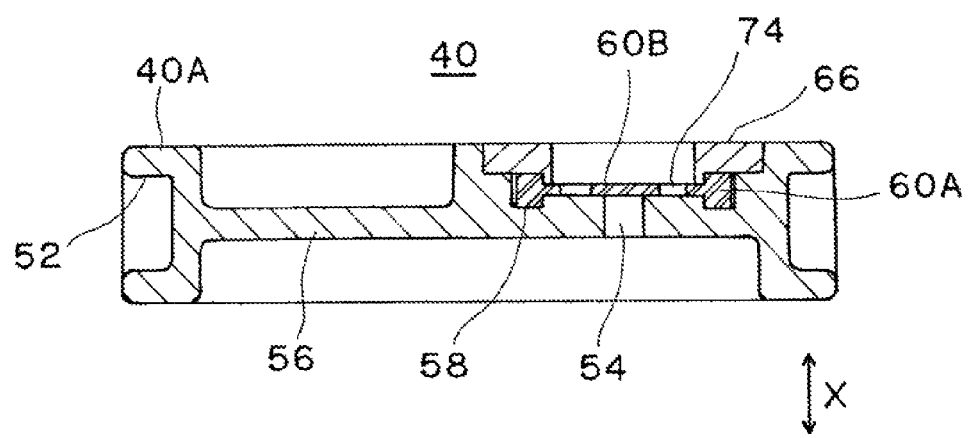
FIG. 2 is a cross-sectional view of a partitioning body of the first embodiment.
Figure 3:
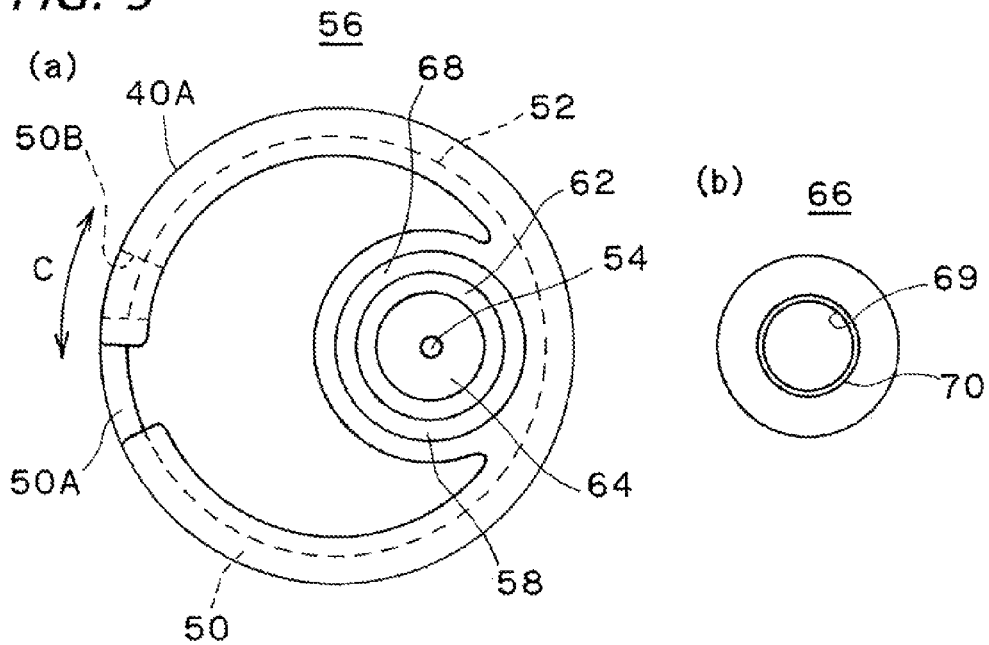
FIG. 3(a) is a plan view of a main body of the partitioning body.
FIG. 3(b) is a bottom view of a fixing member.

As shown in FIG. 2, the second orifice flow path 54 is provided so as to extend in the thickness direction (equal to the axial direction X in the present example) of the partitioning body 40 and penetrate the partitioning body 40 on the inner periphery side (that is, a partitioning body portion on the inner side than the outer peripheral portion 40A in the radial direction) of the partitioning body 40. Specifically, on the upper surface of a partition main body 56, a stepped concave portion 58 with a circular shape in plan view is provided (see FIG. 3(a)), and the second orifice flow path 54 is formed by providing a circular through hole in the center portion of the stepped concave portion 58.

Figure 4:
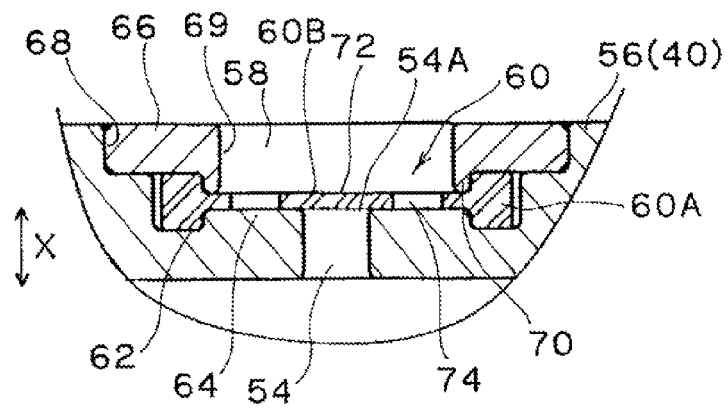
FIG. 4 is an enlarged cross-sectional view of a relevant part of the partitioning body (a normal use region).

In the stepped concave portion 58 of the partitioning body 40, a second diaphragm 60 formed of a flexible rubber membrane is provided at the opening 54A of the main liquid chamber 42 side of the second orifice flow path 54. As shown in FIG. 4, the second diaphragm 60 is provided so that the outer peripheral portion 60A is held against the partitioning body 40 in a liquid-tight manner and is provided so as to come into contact with the opening periphery portion so that the opening 54A is blocked from the main liquid chamber 42 side by the flexible membrane section 60B on the inner side than the outer peripheral portion 60A.

Figure 6:
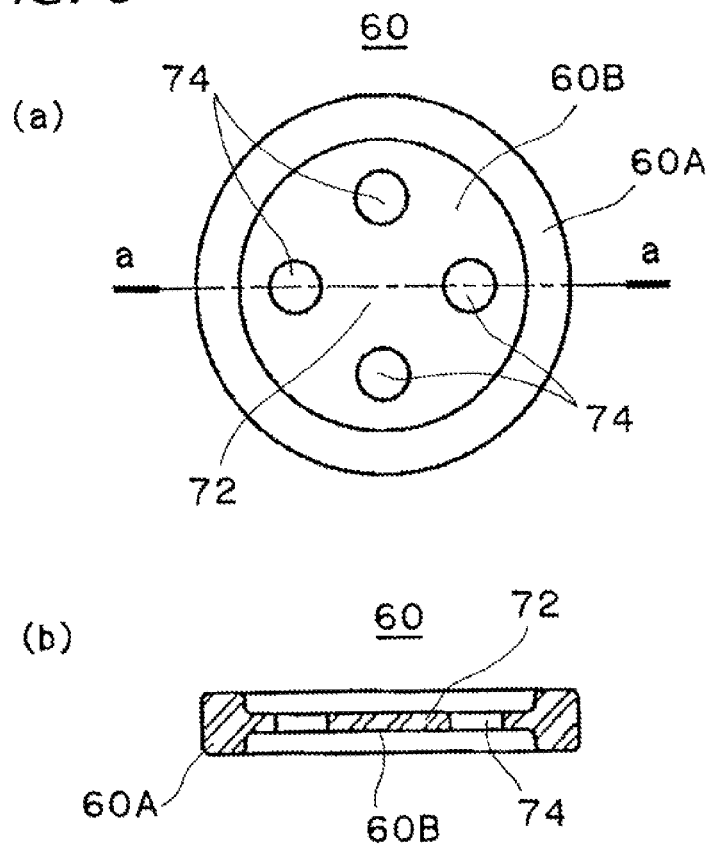
FIG. 6 shows the second diaphragm of the present embodiment, (a) is a plan view thereof, and (b) is a cross-sectional view taken from a line a-a thereof.

Specifically, as shown in FIG. 6, the second diaphragm 60 forms a disc form (a circular membrane shape), the outer peripheral portion 60A forms a thick wall shape over the entire circumference, and the second diaphragm 60 has a flexible membrane section 60B forming a circular thin membrane shape on the inside of the outer peripheral portion 60A of the thick wall. The flexible membrane section 60B is formed so as to block between the inner peripheral surfaces of the outer peripheral portion 60A in a middle position of the outer peripheral portion 60A in the thickness direction.

Furthermore, the stepped concave portion 58 of the partitioning body 40 is provided with an annular groove 62 on which the outer peripheral portion 60A of the second diaphragm 60 is placed, and a circular ridge portion 64 having a flat upper surface, with which the flexible membrane section 60B of the diaphragm 60 comes into contact, is provided on the inside thereof.

Moreover, a fixing member 66 for fixing the second diaphragm 60 placed in the stepped concave portion 58 is included. The fixing member 66 is formed from a rigid material such as resin and metal. As shown in FIG. 4, the fixing member is fitted and fixed to a stepped portion 68 of the outer peripheral portion of the stepped concave portion 58 and interposes, in a compressed state, the outer peripheral portion 60A of the second diaphragm 60 between the fixing member 66 and the annular groove 62 of the partition main body 56 in the axial direction X, thereby holding the outer peripheral portion 60A of the second diaphragm 60 in a liquid-tight manner (that is, so that liquid does not leak). As shown in FIG. 3(b), the fixing member 66 has a ring plate shape having an opening portion 69 in a center portion thereof, and by providing the opening portion 69, a wall portion limiting flexural deformation of the flexible membrane section 60B is not present above (the main liquid chamber 42 side) of the flexible membrane section 60B. In the inner peripheral edge portion of the fixing member 66, a ring-shaped protrusion 70 protruding to the subsidiary liquid chamber 44 side and pressing the outer peripheral edge of the flexible membrane section 60B is provided. The ring-shaped protrusion 70 comes into contact with the inner peripheral surface of the outer peripheral portion 60A of the second diaphragm 60 to restrict the inward displacement of the outer peripheral portion 60A.

In this manner, in the second diaphragm 60 that is built into the partitioning body 40, the flexible membrane section 60B is pressed against the upper surface of the ridge portion 64 of the stepped concave portion 58, thereby blocking the opening 54A of the second orifice flow path 54. The flexible membrane section 60B blocks the opening 54A by the radial direction center portion thereof, and for that reason, the radial direction center portion blocking the opening 54A is a stopper portion 72.

The flexible membrane section 60B includes at least one through hole 74 at a position where the through hole 74 does not overlap the opening 54A of the second orifice flow path 54, that is, at a position where the through hole 74 does not overlap the opening 54A when viewed from the axial direction X. The through holes 74 are arranged in a plurality of locations on the circumference surrounding the stopper portion 72 located in the center of the flexible membrane section 60B. In the present example, four circular through holes 74 are provided at equal distances.

Figure 5:
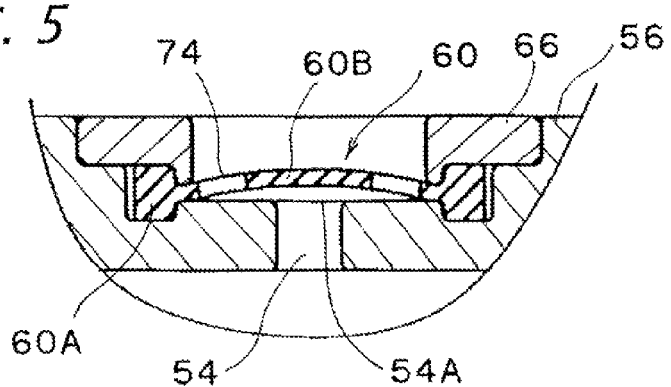
FIG. 5 is an enlarged cross-sectional view of a relevant part of the partitioning body (when a second diaphragm is subjected to flexural deformation).

With the liquid-sealed vibration isolator 10 configured as above, in the normal use region in which the liquid pressure of the main liquid chamber 42 is equal to or greater than a prescribed value, the flexible membrane section 60B of the second diaphragm 60 comes into contact with the opening 54A of the second orifice flow path 54 to block the opening 50A. For that reason, in the normal use region, the leakage of liquid from this portion can be prevented. Meanwhile, when the liquid pressure of the main liquid chamber 42 becomes lower than the prescribed value that may cause cavitation and the flow rate of the second orifice flow path 54 is equal to or greater than a predetermined amount, as shown in FIG. 5, the inner flexible membrane section 60B is pressed against the main liquid chamber 42 side by the liquid flow, whereby the second diaphragm 60 held at the outer peripheral portion 60A is subjected to flexural deformation so as to be separated from the opening 54A of the second orifice flow path 54 to the main liquid chamber 42 side (that is, the upside). As a result, it is possible to supply liquid from the through hole 74 provided in the flexible membrane section 60B to the main liquid chamber 42 side. In addition, since the inflow of liquid from the main liquid chamber 42 to the second orifice flow path 54 is prevented by the second diaphragm 60, the flexible membrane section 60B serves as a check valve.

Thus, with the liquid-sealed vibration isolator 10, in the normal use region, when the vibration of the low-frequency side is input at a relatively large amplitude like a shake vibration while a vehicle runs, since liquid comes and goes between the main liquid chamber 42 and the subsidiary liquid chamber 44 via the first orifice flow path 50 of the low-frequency side while preventing the liquid from leaking in the second diaphragm 60, the high dampening performance is exhibited with respect to the shake vibration, based on the resonance action of liquid flowing through the first orifice flow path 50.

Furthermore, when the vibration of the high-frequency side is input at a relatively small amplitude like a stopped idle time, the second diaphragm 60 is subjected to flexural deformation to a small amplitude while maintaining the blocked state relative to the opening 54A of the second orifice flow path 54, whereby liquid flows in the second orifice flow path 54 of the high-frequency side, and the excellent anti-vibration effect relative to the idle vibration is exhibited by the resonance action of liquid through the second orifice flow path 54 of the high-frequency side.

Meanwhile, when the flow rate of the second orifice flow path 54 reaches a predetermined amount or more by the large amplitude input, the flexible membrane section 60B of the second diaphragm 60 is subjected to the flexural deformation so as to be separated from the opening 54A of the second orifice flow path 54 to the main liquid chamber 42 side. As a result, since liquid is supplied from the through hole 74 provided in the flexible membrane section 60B to the main liquid chamber 42 side, it is possible to perform the pressure relaxation relative to the excessive negative pressure generation in the main liquid chamber 42, and the generation of cavitation can be suppressed.

After the second diaphragm 60 is separated, when the flow rate of the second orifice flow path 54 reaches a predetermined amount or less, the second diaphragm 60 comes into contact with the opening 54A of the second orifice flow path 54 again. However, since the restoring force is due to the rubber elasticity, the impact associated with the return is small, and the abnormal noise associated with the return is hardly generated.

In this manner, with the vibration isolator 10 of the present embodiment, the second diaphragm 60 having a role as a diaphragm causing the liquid flow in the second orifice flow path 54 in the normal use region is used as a value for performing the pressure relaxation when the flow rate of the second orifice flow path 54 reaches a predetermined amount or more. For that reason, it is possible to promote a reduction in the number of component and a simplification of a structure. Furthermore, since a structure is provided in which the movable part as the valve is formed from a rubber-like elastic body, there is no need for rust proofing unlike in the case of using a metal spring, and an increase in cost can be suppressed.

According to the present embodiment, the flexible membrane section 60B of the second diaphragm 60 is configured so that the radial direction center portion thereof is set as the stopper portion 72 and the through hole 74 is provided in the outside in the radial direction. Thus, when the second diaphragm 60 is subjected to flexural deformation, the gap between the opening 54A of the second orifice flow path 54 and the stopper member 72 can be increased, whereby liquid can be more smoothly supplied to the main liquid chamber 42 side.

[Second Embodiment]

Figure 7:
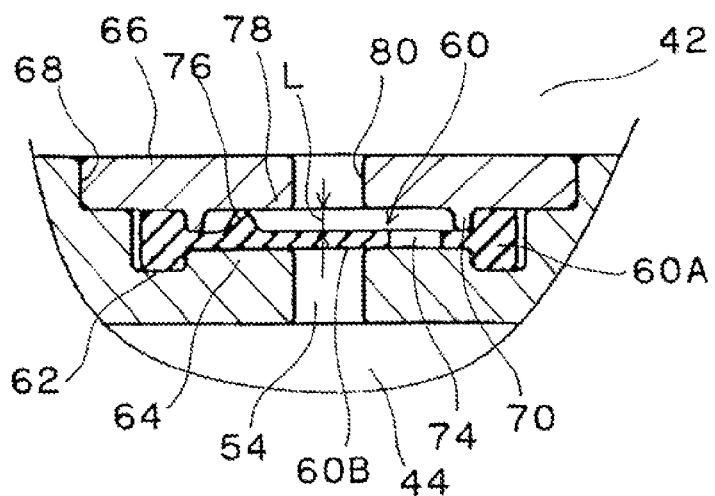
FIG. 7 is an enlarged cross-sectional view of a relevant part of the partitioning body according to a second embodiment.
Figure 8:
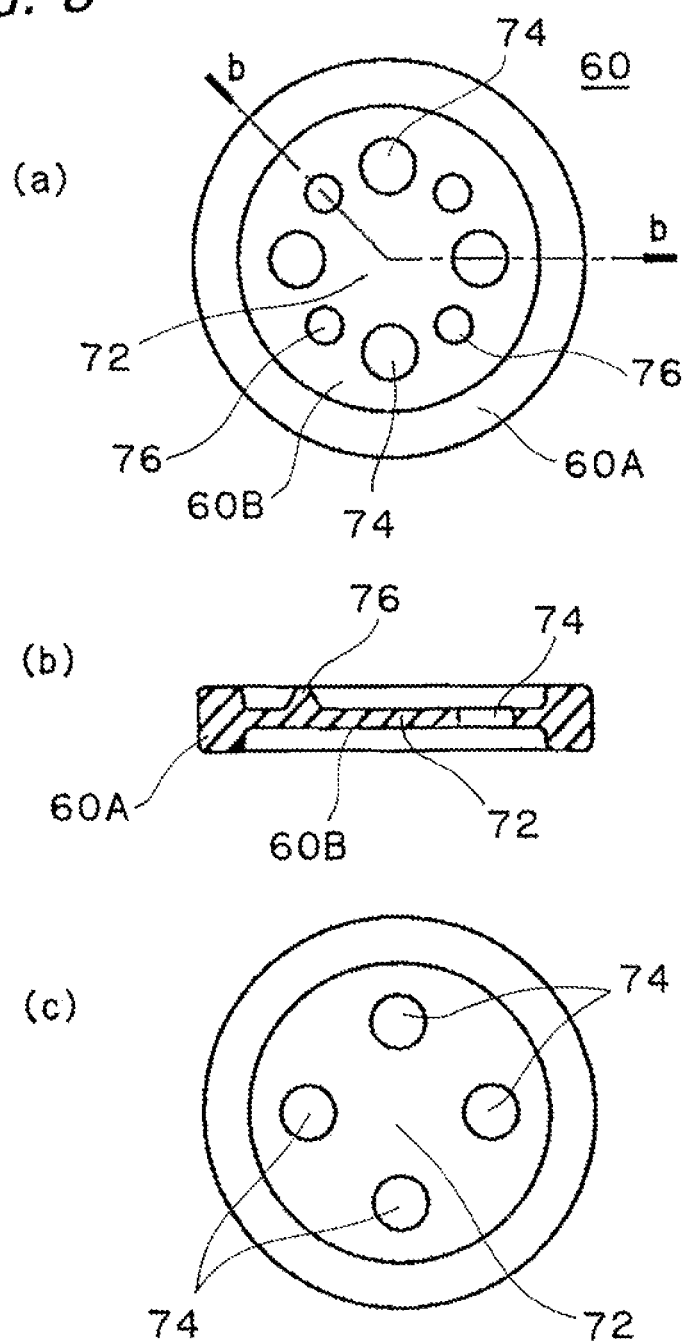
FIG. 8 shows the second diaphragm according to a second embodiment, (a) is a plan view thereof, (b) is a cross-sectional view taken along a line b-b thereof, and (c) is a bottom view thereof.

FIGS. 7 and 8 are diagrams concerning a liquid-sealed vibration isolator of a second embodiment. The present example is different from the first embodiment mentioned above in that a protrusion 76 is provided in the flexible membrane section 60B of the second diaphragm 60.

Specifically, as shown in FIG. 7, on the main liquid chamber 42 side of the second diaphragm 60, an opposed wall 78 is provided which is opposed to the membrane surface of the main liquid chamber 42 side of the flexible membrane section 60B at an interval L. The opposed wall 78 is integrally provided in the fixing member 66. Thus, in the present example, the fixing member 66 forms a disc shape, the center portion thereof is provided with a communication hole 80 through which the main liquid chamber 42 and the second orifice flow path 54 side communicate with each other, the periphery portion of the communication hole 80 constitutes the opposed wall 78. The ring-shaped protrusion 70 is provided on the outer circumference of the opposed wall 78, and the outer peripheral portion 60A of the second diaphragm 60 is interposed by the outer peripheral portion of the fixing member 66 positioned on the outer circumference.

Furthermore, in the flexible membrane section 60B, on the membrane surface of the main liquid chamber 42 side at a position which does not overlap with the opening 54A of the second orifice path 54, the protrusion 76 which is configured to be compressed between the flexible membrane section 60B and the opposed wall 78 is provided. In the present example, the protrusion 76 is configured so as to be pressed against the opposed wall 78 and compressed in the state of being built into the partitioning body 40.

The protrusion 76 is provided only in the membrane surface of the main liquid chamber 42 side, and as shown in FIG. 8, forms a conical solid, in the present embodiment, a conical shape. The protrusions 76 are provided alternately with the through hole 74 in a plurality of locations (four locations in this example) on the circumference as in the through hole 74.

In this manner, since the rigidity of the second diaphragm 60 can be changed by compressing the protrusion 76 provided on the main liquid chamber 42 side of the flexible membrane section 60B between the opposed wall 78 and the flexible membrane section 60B, it is possible to easily adjust the timing of separation from the opening 54A of the second orifice flow path 54.

Specifically, in order to improve the characteristics of the second orifice flow path 54 of the high-frequency side, it is required to reduce the rigidity of the membrane section (the stopper portion 72) blocking the opening 54A of the second orifice flow path 54 to facilitate the small deformation. However, for that reason, if the rubber hardness is simply reduced, the second diaphragm 60 is easily subjected to flexural deformation when a large amplitude is input, and the second diaphragm 60 is early separated from the opening 54A of the orifice flow path 54. Thus, there is a concern that the original damping performance due to the first orifice flow path 50 may be degraded. On the contrary, if the protrusion 76 is provided, while the rubber hardness is reduced to facilitate the small deformation of the stopper portion 72 of the center portion and the rigidity of the periphery portion is increased by the compression of the protrusion 76, whereby the timing of being separated from the opening 54A of the second orifice flow path 54 can be delayed. Furthermore, if the rubber hardness can be reduced, the impact can also be suppressed when the second diaphragm 60 is returned, which can make it difficult to generate the abnormal noise.

Furthermore, like the present embodiment, by providing the plurality of protrusions 76 on the circumference alternately with the through hole 74, the rigidity of the second diaphragm 60 relative to the flexural deformation can be made uniform on the circumference, and the adjustment of the timing of being separated from the opening 54A of the second orifice flow path 54 is more facilitated. Other configurations and working effects are the same as those of the first embodiment, and the descriptions thereof will be omitted.

[Third Embodiment]

Figure 9:
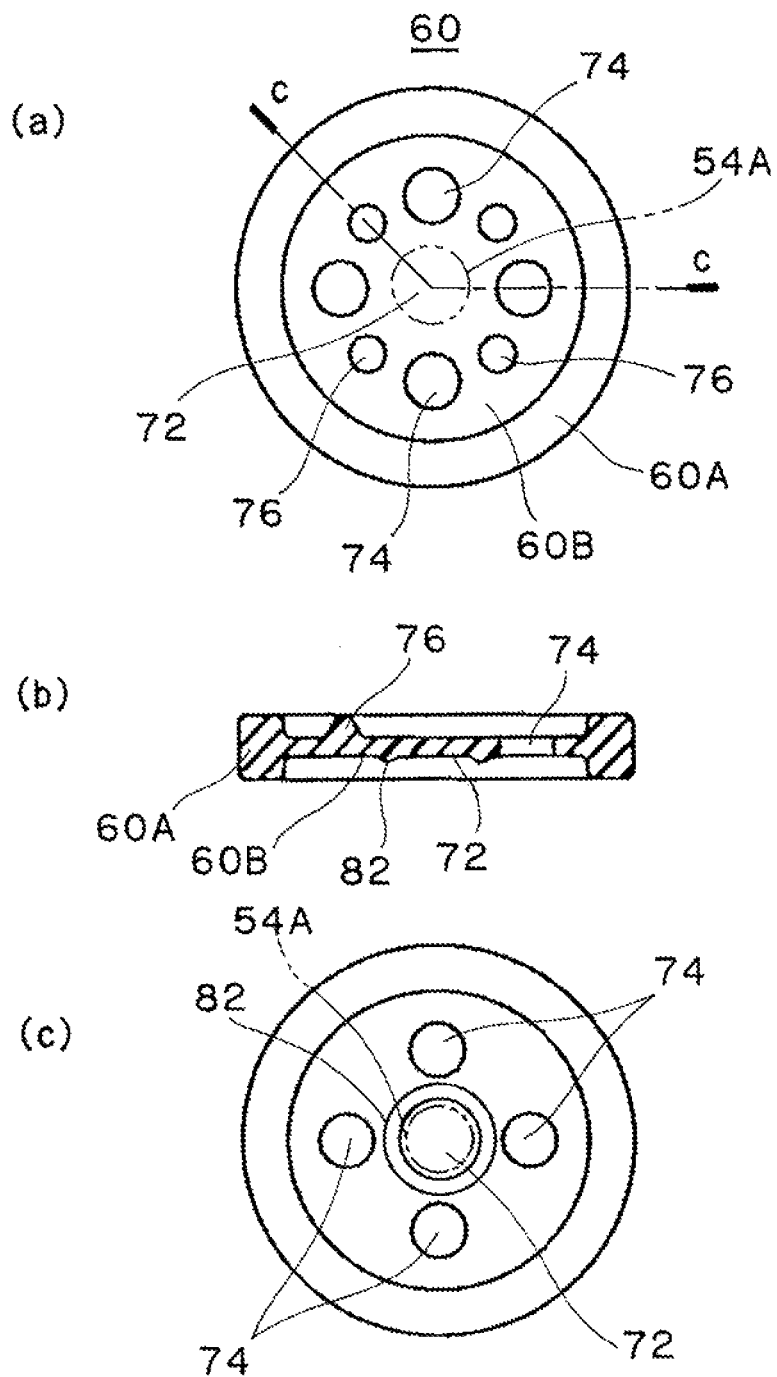
FIG. 9 shows the second diaphragm according to a third embodiment, (a) is a plan view thereof, (b) is a cross-sectional view taken along a line c-c thereof, and (c) is a bottom view thereof.

FIG. 9 is a diagram concerning a liquid-sealed vibration isolator of a third embodiment. The present example is different from the second embodiment mentioned above in that an annular protrusion 82 is provided in the flexible membrane section 60B of the second diaphragm 60.

That is, in the present example, on the membrane surface of the subsidiary liquid chamber 44 side of the flexible membrane section 60B opposed to the periphery portion of the opening 54A of the second orifice flow path 54, the annular protrusion 82 extending over the entire circumference so as to surround the opening 54A is provided. The annular protrusion 82 is provided in a circular shape when viewed from the plan along the outer peripheral portion of the stopper portion 72 corresponding to the center portion of the flexible membrane section 60B, and is provided on the inner side than the through hole 74 and the protrusion 76 in the radial direction.

The annular protrusion 82 acts as a seal ridge that seals the periphery of the opening 54A when bringing the second diaphragm 60 into contact with the opening 54A of the second orifice flow path 54. For that reason, in regard to the liquid flow in the second orifice flow path 54 until the flow rate of the second orifice flow path 54 reaches a predetermined amount, it is possible to more reliably secure the liquid tightness between the second diaphragm 60 and the opening 54A of the second orifice flow path 54. Other configurations and working effects are the same as those of the second embodiment, and the descriptions thereof will be omitted.

[Other Embodiments]

The arrangements, numbers and shapes of the through hole 74 and the protrusion 76 provided in the second diaphragm 60 are not limited to the embodiments mentioned above, but can be variously changed. For example, in the embodiments mentioned above, the center portion of the flexible membrane section 60B is set as the stopper portion 72 blocking the opening 54A of the second orifice flow path 54 and a plurality of through holes 74 is provided therearound. However, the opening 54A may be provided on one side so as to be eccentric with respect to the center of the flexible membrane section 60B, and the through holes 74 may be provided on the other side thereof.

Furthermore, in the embodiments mentioned above, the annular protrusion 82 is provided in the flexible membrane section 60B of the second diaphragm 60, but the annular protrusion may be provided on the partitioning body 40 side. That is, an annular protrusion protruding to the second diaphragm 60 side may be provided on the periphery portion of the opening 59A of the second orifice flow path 54 so as to surround the opening 54A.

Furthermore, in the embodiments mentioned above, a case has been described where the liquid chamber includes the main liquid chamber 42 and the single subsidiary liquid chamber 44. However, the invention can also similarly be applied to various liquid-sealed vibration isolators which have a plurality of subsidiary liquid chambers together with the main liquid chamber and in which portions between the liquid chambers are connected to each other via the orifice flow path. In that case, a subsidiary liquid chamber communicating with the main liquid chamber via the first orifice flow path may be identical to or different from a subsidiary liquid chamber communicating with the main liquid chamber via the second orifice flow path. Furthermore, another orifice flow path may be included through which the subsidiary liquid chambers communicate with each other.

Preferably, as in the embodiments mentioned above, in the second orifice flow path 54 connecting between the subsidiary liquid chamber 44 using the first diaphragm 38 facing the air chamber 46 as a part of the chamber wall and the main liquid chamber 42, the value configuration of the second diaphragm 60 is incorporated. Since the subsidiary liquid chamber 44 using the first diaphragm 38 facing the air chamber 46 as a part of the chamber wall has a great pressure difference between the subsidiary liquid chamber 44 and the main liquid chamber 42, the flow rate of the second orifice flow path 54 is easily increased. For that reason, the pressure relaxation effect due to the second diaphragm 60 can be enhanced. In addition, even in this case, the subsidiary liquid chamber connected to the main liquid chamber via the first orifice flow path may be identical to or different from the subsidiary liquid chamber connected to the main liquid chamber via the second orifice flow path. Furthermore, the first diaphragm 38 may face the external air instead of the air chamber 46.

The embodiments mentioned above have been subjected to the shake vibration and the idle vibration, but the invention can be applied to various vibrations having frequencies different from each other without being limited thereto. In addition, although not separately enumerated, various modifications can be made without departing from the gist of the invention.

Industrial Applicability

The invention can be used for various vibration isolators, for example, such as amount supporting other power units such as a motor, a body mount, and a differential mount other than the engine mount.

REFERENCE SIGNS LIST

10: liquid-sealed vibration isolator
12: first fixture
14: second fixture
16: vibration isolating base
36: liquid sealing chamber
38: first diaphragm
40: partitioning body
40A: outer peripheral portion of partitioning body
42: main liquid chamber
44: subsidiary liquid chamber
46: air chamber
50: first orifice flow path
54: second orifice flow path
54A: opening of main liquid chamber side
60: second diaphragm
60A: outer peripheral portion
60B: flexible membrane section
72: stopper portion
74 through hole
76: protrusion
78: opposed wall
82: annular protrusion
X: axial direction
C: circumferential direction
L: gap

The invention claimed is:
1. A liquid-sealed vibration isolator, comprising:
a first fixture to be attached to one of a vibration source side and a support side;
a second fixture to be attached to the other of the vibration source side and the support side;

a vibration isolating base which is interposed between the first fixture and the second fixture and is formed of a rubber-like elastic body;

a main liquid chamber, a portion of a chamber wall of the main liquid chamber is formed by the vibration isolating base, and which is sealed with liquid;

at least one subsidiary liquid chamber, a portion of a chamber wall of the subsidiary liquid chamber is formed by a diaphragm formed of a rubber-like elastic membrane, and which is sealed with liquid;

a first orifice flow path which connects the main liquid chamber with one of the subsidiary liquid chambers;

a second orifice flow path which is tuned to a frequency range higher than the first orifice flow path and connects the main liquid chamber with one of the subsidiary liquid chambers; and a partitioning body which partitions the main liquid chamber and one of the subsidiary liquid chambers and is formed with the second orifice flow path, wherein the partitioning body is provided with a second diaphragm formed of a rubber-like elastic membrane in an opening to the main liquid chamber side of the second orifice flow path, the second diaphragm comprises a flexible membrane section and an outer peripheral portion, the second diaphragm is configured so that the outer peripheral portion is held against the partitioning body in a liquid-tight manner, the second diaphragm is in contact with an opening periphery portion so as to block the opening, and the flexible membrane section is provided with at least one through hole at a position which does not overlap the opening, and the second diaphragm is configured so that, when a flow rate of the second orifice flow path is equal to or greater than a predetermined amount, the flexible membrane section is subjected to a flexural deformation so as to be separated from the opening of the second orifice flow path to the main liquid chamber side, whereby liquid is supplied from the through hole provided in the flexible membrane section to the main liquid chamber side, such that the flexural deformation of the second diaphragm opens a path between the second orifice flow path and the at least one through hole, such that a radially outer most portion is fixed and remains stationary irrespective of the flow rate.

2. The liquid-sealed vibration isolator according to claim 1, wherein an opposed wall opposed to a membrane surface of the main liquid chamber side of the flexible membrane section at an interval is provided at the main liquid chamber side of the second diaphragm, and the flexible membrane section is provided with a protrusion which is configured to be compressed to the opposed wall on the membrane surface of the main liquid chamber side at a position which does not overlap the opening of the partitioning body.

3. The liquid-sealed vibration isolator according to claim 1, wherein an annular protrusion is provided so as to surround the opening in the periphery portion of the opening of the partitioning body or on the membrane surface of the subsidiary liquid chamber side of the flexible membrane section facing the periphery portion.

4. The liquid-sealed vibration isolator according to claim 1, wherein the flexible membrane section is configured so that a center portion thereof in a radial direction is a stopper portion blocking the opening, and has one or more through hole on the outside of the stopper portion in the radial direction.

5. The liquid-sealed vibration isolator according to claim 2, wherein the flexible membrane section is configured so that the center portion thereof in the radial direction is a stopper portion blocking the opening, at least one through hole includes multiple through holes which are arranged in a plurality of locations on a circumference surrounding the stopper portion, and the protrusions are provided alternately with the through holes in the plurality of locations on the circumference.

6. The liquid-sealed vibration isolator according to claim 1, wherein the diaphragm forming the portion of the chamber wall of the subsidiary liquid chamber connected to the main liquid chamber by the second orifice flow path forms a partition with an air chamber or external air.

7. The liquid-sealed vibration isolator according to claim 1, wherein the first fixture forms a cylindrical shape, the second fixture is placed on an axial center portion of the first fixture, a first diaphragm is provided which is attached to the first fixture and is formed of the rubber-like elastic membrane forming a liquid sealing chamber between the first diaphragm and the vibration isolating base on the inside of the first fixture, the partitioning body partitions the liquid sealing chamber into the main liquid chamber of the vibration isolating base side and the subsidiary liquid chamber of the first diaphragm side, the first orifice flow path is provided on a outer peripheral portion of the partitioning body and connects the main liquid chamber with the subsidiary liquid chamber, and the second orifice flow path is provided so as to connect the main liquid chamber with the subsidiary liquid chamber in a partitioning body portion on the inner side than the outer peripheral portion of the partitioning body.

8. The liquid-sealed vibration isolator according to claim 1, wherein the flexible membrane section function as a check valve which allows liquid to flow into the main liquid chamber from the second orifice flow path by flexural deformation of the flexible membrane section to the main liquid chamber side and which prevents liquid from flowing into the second orifice flow path form the main liquid chamber.

* * * * *